May 5, 1959  R. J. ENSTROM  2,884,791
CONTROL MECHANISM
Filed Sept. 6, 1955
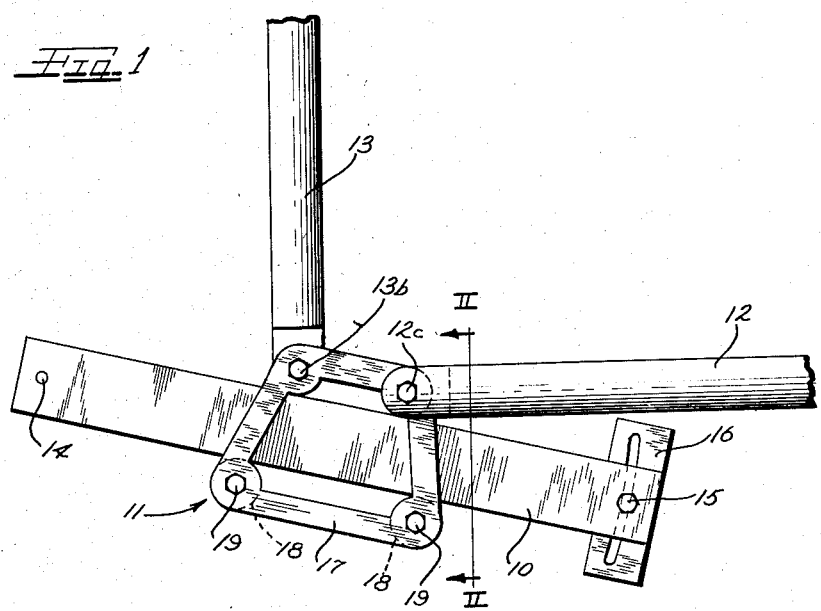
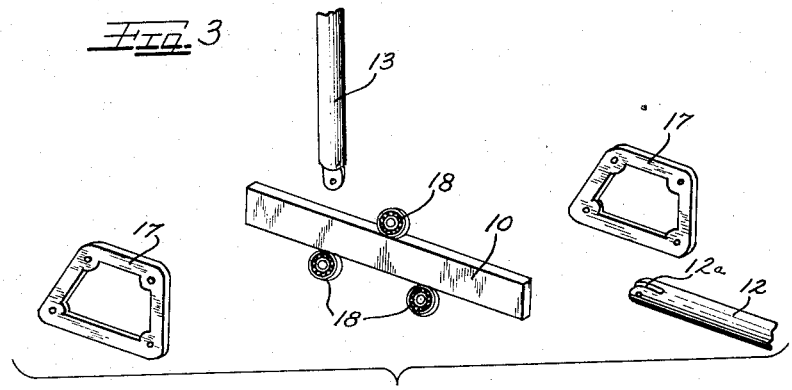
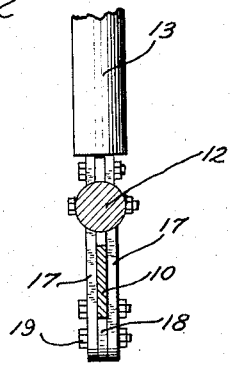
Inventor
Rudolph J. Enstrom.

United States Patent Office 2,884,791
Patented May 5, 1959

2,884,791

CONTROL MECHANISM

Rudolph J. Enstrom, Crystal Falls, Mich.

Application September 6, 1955, Serial No. 532,673

6 Claims. (Cl. 74—110)

This invention relates in general to a control mechanism, and more particularly to a control mechanism capable of translating reciprocable movement of a member along one plane to reciprocable movement in a second member along another plane angularly related to the first plane. The invention is particularly useful in connection with aircraft, and specifically with push-pull tubes in helicopters, although other uses and purposes will be apparent to one skilled in the art.

The rotors on most helicopters are controlled by two push-pull tubes which give the helicopter directional movement and stability. A control stick is connected to the push-pull tubes for changing the rotor pitch in flight while the rotor rotates at an average of 300 r.p.m. One tube is for forward flight, the other for lateral flight. When the pilot has moved the control stick to the position he desires to attain a certain flight path, he would like the control stick to remain in that position with a minimum amount of correction. However, aerodynamic forces acting on the main rotor blades will cause these controls to have a tendency to move, due to the tremendous amount of feedback pressures in the controls and the shock and vibration imparted from the rotor blades.

Heretofore, movement was translated between the control stick and push-pull tubes through a conventional bell crank arrangement which is totally susceptible to the feedback pressures thereby necessitating complete attention and frequent correction by the pilot. Such is fatiguing and unpleasant to the pilot. To help prevent feedback pressures in bell crank arrangements, disk assemblies which are adjustable friction devices have been developed, but have not proven altogether satisfactory.

Accordingly, it is an object of this invention to provide an improved control mechanism for translating reciprocable movement in one plane to reciprocable movement in another plane angularly related to the first plane.

A further object of this invention is in the provision of a control mechanism that translates horizontal movement to vertical movement.

Another object of this invention is to provide a control mechanism for use in controlling rotor blade pitch on helicopters that provides ease of operation and accuracy of control.

Still another object of this invention resides in the provision of a control mechanism for use in regulating the rotor blade pitch on helicopters, wherein substantially all of the feedback pressures and shock and vibration are eliminated.

Another feature of the invention is to provide a control mechanism for translating reciprocable movement along one plane to reciprocable movement along another plane angularly related to the first plane, wherein the amount of reciprocable movement in the second plane may be varied relative to the reciprocable movement in the first plane.

Other objects, features, and advantages of the invention will be apparent from the following detailed disclosure, taken in conjunction with the accompanying sheet of drawing, wherein like reference numerals refer to like parts, in which:

On the drawings:

Figure 1 is a fragmentary side elevational view of a control mechanism constructed in accordance with the principles of the present invention;

Figure 2 is a transverse sectional view, with parts in elevation, taken substantially along line II—II of Figure 1; and Figure 3 is an exploded perspective view of the control mechanism illustrated in Figure 1, with some parts omitted for purposes of clarity.

While the present invention will be described as applied to controls used in helicopters, it is to be understood that the scope of the invention is not to be restricted to such use.

The control mechanism of the invention generally comprises an inclined stationary steel bar or track 10 affixed to the fuselage of a helicopter, a carriage 11 movable along the bar or track 10, a push-pull tube or control rod 12 connected to the control stick of the aircraft and to the carriage 11, and a push-pull tube or controlled member 13 connecting the swash plate and other mechanism associated with the rotor blades (not shown) to the carriage 11.

The stationary steel bar 10 is substantially rectangular in cross section in the instant case, but may take the from of a round bar if desired. One end of the bar 10 is pivotally connected to the fuselage at 14 in any suitable manner such as by a nut and bolt arrangement. The other end of the bar 10 is adjustably secured by a nut and bolt assembly 15 to an arcuately slotted bracket 16, the latter being suitably attached to the fuselage. Thus, by loosening the nut and bolt assembly 15, the inclination of the bar 10 to the horizontal plane may be varied. While only one end of the bar is shown to be adjustably mounted, it is to be understood that the other end of the bar may be likewise adjustably mounted if desired.

The carriage 11 includes a pair of trapezoidally-shaped oppositely disposed plates 17, 17 having sandwiched therebetween a plurality of rollers or ball bearing assemblies 18. In the instant case, a pair of rollers 18 are located adjacent each bottom corner of the plates, while a single roller is located near the top of the plates and at one corner. The corner forming portions of the plates 17 are suitably apertured to receive nut and bolt assemblies 19 to hold the plates together and rotatably mount the rollers 18. It is noted that the bar or track 10 is sandwiched between the opposed plates 17. To reduce the weight of the assembly, the plates 17 are hollowed in the center portion thereof.

The controlled member 13 is suitably apertured at one end to be received between the plates 17 and pivotally connected thereto by a nut and bolt assembly 13b. It is seen that the push-pull tube 13 extends in substantially a vertical direction and forms an acute angle with the bar 10 inclined to the horizontal plane.

The control stick 12 is bifurcated at one end 12a, and the bifurcated portions are suitably apertured to be pivotally received on a nut and bolt assembly 12c which extends through one corner of the plate 17. The bifurcations of the rod 12 are received on the outer faces of the plate 17, and the pivot bolt arrangement 12c also holds the upper roller 18 in position between the plates. It is seen that the control rod 12 assumes substantially a generally horizontal position and forms an acute angle with the bar 10 inclined to the horizontal plane. The control rod 12 and the controlled member 13 may be generally cylindrical in cross sectional area or of any other desirable shape.

When assembled, the lower rollers 18 of the carriage 11 ride on the bottom face of the bar 10, while one roller 18 rides on the upper face of the bar 10, and the sides of the plate 17 prevent displacement of the rollers from their respective bar engaging positions by being closely positioned to the sides of the bar.

In operation, horizontal reciprocable movement of the control rod 12 reciprocates the carriage 11 along the inclined bar 10, and the carriage 11 transmits a vertical reciprocable movement to the controlled member 13. Any shock or vibrations imparted to the controlled member 13 from the rotor blades is absorbed by the steel bar 10, thereby permitting ease of operation and accuracy of control through the control rod 12 and substantially eliminating feedback pressures to the control rod.

By varying the position of the adjustable end of the bar 10, relative movement between the control rod 12 and the controlled member 13 may be varied. For example, lowering the adjustable end of the bar 10 will decrease the horizontal component of the carriage 11 when moving along the bar 10, while increasing the vertical component thereof. Thus a greater vertical movement of the controlled member 13 is imparted by a smaller horizontal movement of the control rod 12.

From the foregoing, it is seen that the present invention provides a simply constructed control mechanism which enables ease of operation and accurateness in control, while substantially eliminating any vibration or feedback pressures from the controlled members.

It will be understood that modifications and variations may be effected without departing from the scope of the novel concepts of the present invention, but it is understood that this application is to be limited only by the scope of the appended claims.

I claim as my invention:

1. In a control mechanism, a carriage, fixed member, means mounting said carriage on said fixed member for movement confined to a predetermined fixed path along said fixed member, a control rod pivotally attached to said carriage, a controlled member pivotally attached to said carriage, said control rod having an axis forming a first acute angle with said predetermined path, said controlled member having an axis forming a second angle with said predetermined path, said axes of said control rod and said controlled member defining a common plane in which said controlled member is translated in response to translation of said control rod, said axes of said control rod and of said control member forming an angle with each other in said common plane.

2. In a control mechanism, an angularly adjustable fixed track member, a carriage mounted for linear motion along said track member, a control rod pivotally connected to one end of said carriage and having an axis forming a first acute angle with said track, a controlled member pivotally connected to the opposite end of said carriage and having an axis forming a second acute angle with said track, the axes of said control rod and of said controlled member defining a common plane and being substantially at right angles to each other in said plane for at least one position of said carriage, movement of said carriage by said control rod thereby producing translation of said controlled member in said plane.

3. A control mechanism for converting translational motion in a first direction to translational motion in a second direction generally perpendicular to said first direction comprising, a fixed bar adjustably mounted and inclined with respect to said first direction, a carriage movable along said bar, a driving member pivotally connected to said carriage and having an axis positioned substantially in said first direction, a driven member pivotally connected to said carriage and having an axis positioned substantially in said second direction, the axes of said driving member and of said driven member defining a common plane in which said driven member is translated in said second direction in response to motion of said driving member in said first direction.

4. A control mechanism for converting translational motion in a first direction to translational motion in a second direction generally perpendicular to said first direction comprising, a fixed bar inclined with respect to said first direction, said bar being mounted at an adjustable angle with respect to said first direction, a carriage having a plurality of movable members for rolling along said bar, said bar having smooth straight surfaces defining a linear path of motion of said carriage along the axis of said bar, a control rod pivotally connected at one end to one end of said carriage, a controlled member pivotally connected at one end to the other end of said carriage, said control rod having an axis forming a first acute angle with said path of motion of said carriage, said controlled member having an axis forming a second acute angle with said path of motion of said carriage, said control rod and said controlled member defining a common plane in which said controlled member is translated in response to translation of said control rod.

5. A control mechanism for converting motion in the first direction to motion in a second direction comprising, a fixed bar mounted and inclined with respect to said first direction, a carriage slidable on said bar, a first push-pull tube pivotally connected to said carriage and having an axis positioned substantially in said first direction so as to form an acute angle with said bar, a second push-pull tube pivotally connected to said carriage and having an axis positioned substantially in said second direction so as to also form an acute angle with said bar, the axes of said first and second push-pull tubes defining a common plane in which said second push-pull tube is translated in response to movement of said carriage along said bar by said first push-pull tube.

6. A control mechanism for converting translational motion in a first direction to translational motion in a second direction at an angle to said first direction comprising, a fixed bar adjustably mounted and inclined with respect to said first direction, a carriage mounted to move freely along said bar, said carriage including a pair of symmetrically shaped opposed plates one on each side of said bar and a plurality of rollers sandwiched between the plates and riding on opposite sides of said bar, a control rod having one end pivotally connected to one end of said carriage and being translatable in said first direction, a controlled member having one end pivotally connected to the other end of said carriage and being translatable in said second direction, said control rod and said controlled member defining a common plane in which said controlled member is translated in response to movement of said carriage along said bar by said control rod.

References Cited in the file of this patent

UNITED STATES PATENTS

| 696,338 | Hullinger | Mar. 25, 1902 |
| 943,010 | Dost | Dec. 14, 1909 |
| 1,103,839 | Rellay | July 14, 1914 |
| 2,162,133 | Spire | June 13, 1939 |
| 2,321,406 | Merchant | June 8, 1943 |

FOREIGN PATENTS

| 796,868 | France | Apr. 16, 1936 |